(12) United States Patent
Saxon et al.

(10) Patent No.: US 7,438,873 B2
(45) Date of Patent: Oct. 21, 2008

(54) ANIMAL SCENT LURE WITH HEATING CAPACITY

(75) Inventors: Donald C. Saxon, Bay Springs, MS (US); Jeremiah Parker, Pinson, AL (US); Mark Mattox, Pinson, AL (US)

(73) Assignee: Warmkraft, Inc., Taylorsville, MS (US)

( * ) Notice: Subject to any disclaimer, the term of this patent is extended or adjusted under 35 U.S.C. 154(b) by 130 days.

(21) Appl. No.: 11/256,709

(22) Filed: Oct. 24, 2005

(65) Prior Publication Data

US 2006/0104868 A1 May 18, 2006

Related U.S. Application Data

(60) Provisional application No. 60/622,356, filed on Oct. 27, 2004.

(51) Int. Cl.
*A61L 9/00* (2006.01)
*A62B 7/08* (2006.01)
*A01M 31/06* (2006.01)
*B65D 85/00* (2006.01)
*A24F 25/00* (2006.01)
*B05B 1/24* (2006.01)
*B67D 5/06* (2006.01)
*B67D 1/08* (2006.01)
*A01K 7/00* (2006.01)

(52) U.S. Cl. ............... 422/305; 422/1; 422/5; 422/120; 422/123; 422/125; 422/306; 422/307; 43/58; 43/1; 43/2; 43/54.1; 206/0.5; 206/804; 206/538; 206/315.11; 239/53; 239/47; 239/134; 239/135; 239/136; 222/180; 222/152; 222/181.1; 222/209; 222/214; 119/72; 119/73; 119/72.5

(58) Field of Classification Search ............... 422/1, 422/5, 120, 123, 125, 306–307, 102, 305; 43/58, 1, 2, 54.1; 206/0.5, 804, 538, 315.11; 239/53, 47, 134–136; 222/180, 152, 181.1, 222/209, 214; 119/72–73
See application file for complete search history.

(56) References Cited

U.S. PATENT DOCUMENTS 4,937,431 A * 6/1990 Jameson et al. ............. 392/395
7,040,548 B2 * 5/2006 Rodgers ...................... 239/34

* cited by examiner

*Primary Examiner*—Jill Warden
*Assistant Examiner*—Monzer R Chorbaji
(74) *Attorney, Agent, or Firm*—Volpe and Koenig, P.C.

(57) ABSTRACT

A scent lure is configured as a reusable container with two separate compartments, one for a scent wick and one for a disposable heating element. The compartments are separated by a common dividing wall and are independently accessible for ease of use. The separate compartments allow the heating element to be removed and/or replaced without contact with the scent wick and vice versa. Preferably, the heating compartment has vents to facilitate continued activation of a heating element during use. The vents are preferably configured to provide a chimney effect that creates a heated air flow over the sent wick for enhancing the lure's effectiveness.

17 Claims, 4 Drawing Sheets

ANIMAL SCENT LURE WITH HEATING CAPACITY

CROSS REFERENCE TO RELATED APPLICATION

This application claims the benefit of U.S. Provisional Patent Application No. 60/622,356, filed on Oct. 27, 2004, which is incorporated by reference as if fully set forth.

FIELD OF THE INVENTION

This invention relates to animal scent lures, and more particularly to a heated animal scent lure.

It is well known that game animals are naturally drawn to certain natural scents, such as the scent of urine of the same species of animal. Hunters often use "scent wicks" saturated with a desired scent to attract animals into their vicinity for shooting or observation.

Scents are typically provided in liquid form and may be used in any of a variety of ways. One way is to pour the liquid scent onto absorbent pads, which are then hung on branches or twigs where the scent is allowed to vaporize into the ambient air to attract the animals. Another way is to pour the liquid scent onto trees or on the ground at either real or artificially created "scrapes," where a male horned animal might mark his territory by scraping the ground with his hooves and depositing some urine thereon. The liquid scents may also be dripped in a controlled manner on either the real or artificial scrape.

Cold weather has a severe and adverse effect in the vaporization of the liquid scents. In subfreezing conditions, the liquid scent may freeze, thereby rendering the product ineffective. In cold, but above subfreezing conditions, the vaporization may be greatly slowed. In response to cold conditions, some scent lures have been designed to include a heating element which prevents the liquid scent from freezing and losing its efficacy. However, such heated scent dispensers suffer from deficiencies including bulkiness and untidiness, among other drawbacks.

It would be highly desirable to provide a heated scent lure dispenser which is easy to use without creating a mess.

SUMMARY OF THE INVENTION

A scent lure is configured as a reusable container with two separate compartments, one for a scent wick and one for a disposable heating element. The compartments are separated by a common dividing wall and are independently accessible for ease of use. The separate compartments allow the heating element to be removed and/or replaced without contact with the scent wick and vice versa.

Preferably, the heating compartment has vents to facilitate continued activation of a heating element during use. The vents are preferably configured to provide a chimney effect that creates a heated air flow over the sent wick for enhancing the lure's effectiveness.

Other objects of the present invention will be apparent to those skilled in the art from the following description and drawings.

DETAILED DESCRIPTION OF THE PREFERRED EMBODIMENT

Figure 1:
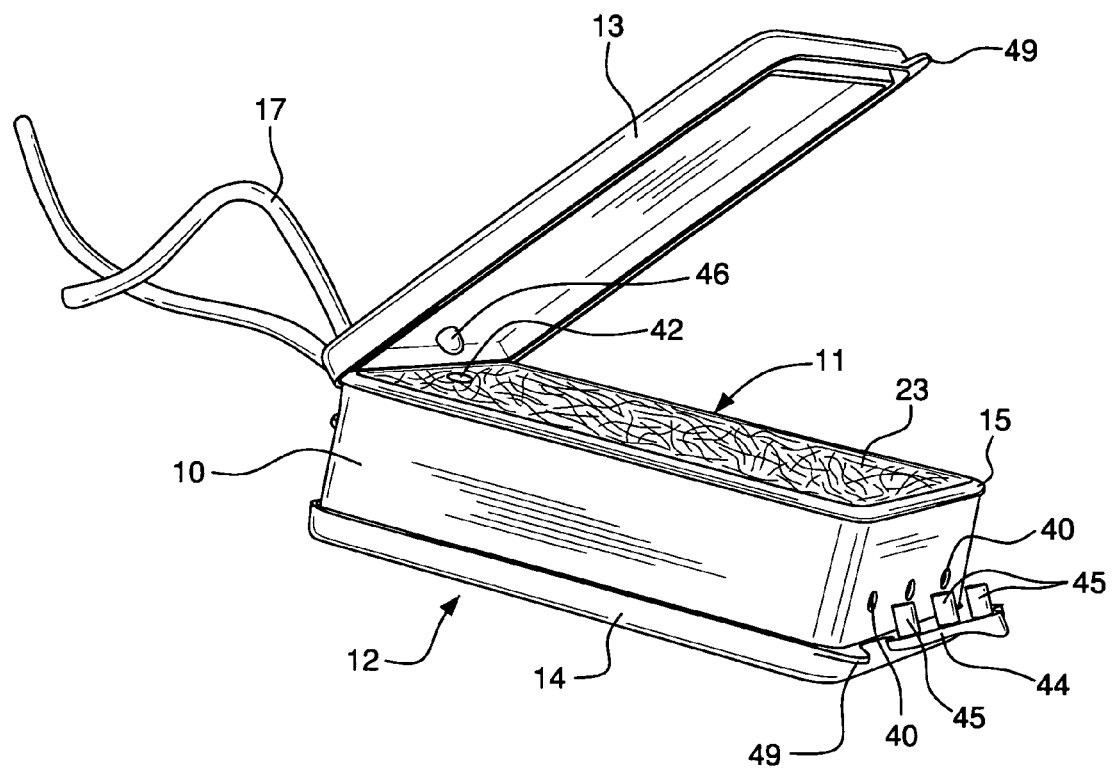
FIG. 1 is a perspective view of a scent lure in an operational configuration made in accordance with the present invention.

Referring to FIGS. 1-4, an animal scent lure is illustrated that is both compact and easy to use without the mess attendant with other heated scent lures. The scent lure has a body 10 configured with two compartments: a scent wick compartment 11 and a heating element compartment 12. The scent wick and heating element compartments 11, 12 are preferably rectangular in shape and have respective selectively shaped compartment covers 13, 14 which are configured to engage respective compartment lips 15, 16 to seal the compartments when closed. When in use, the scent lure is preferably hung from a tree branch or the like by way of a fastening device 17, which may be a wire, string, hook, or any other suitable device.

To facilitate connection of the compartment covers 13, 14 and the fastener 17 to the body 10 of the scent lure, an extension tab 18 is provided on the top of the scent lure body 10. The extension tab 18 preferably has an aperture 19 for receiving the fastening device 17 therethough and two slots 20 for receiving compartment cover retention tabs 21, 22. The scent compartment cover 13 preferably has a pair of retention tabs 21 which are spaced to engage respective outer portions of the scent lure body extension tab slots 20. The heating element compartment cover 14 preferably has a pair of retention tabs 22 which are spaced to engage respective inner portions of the scent lure body extension tab slots 20.

Figure 4:
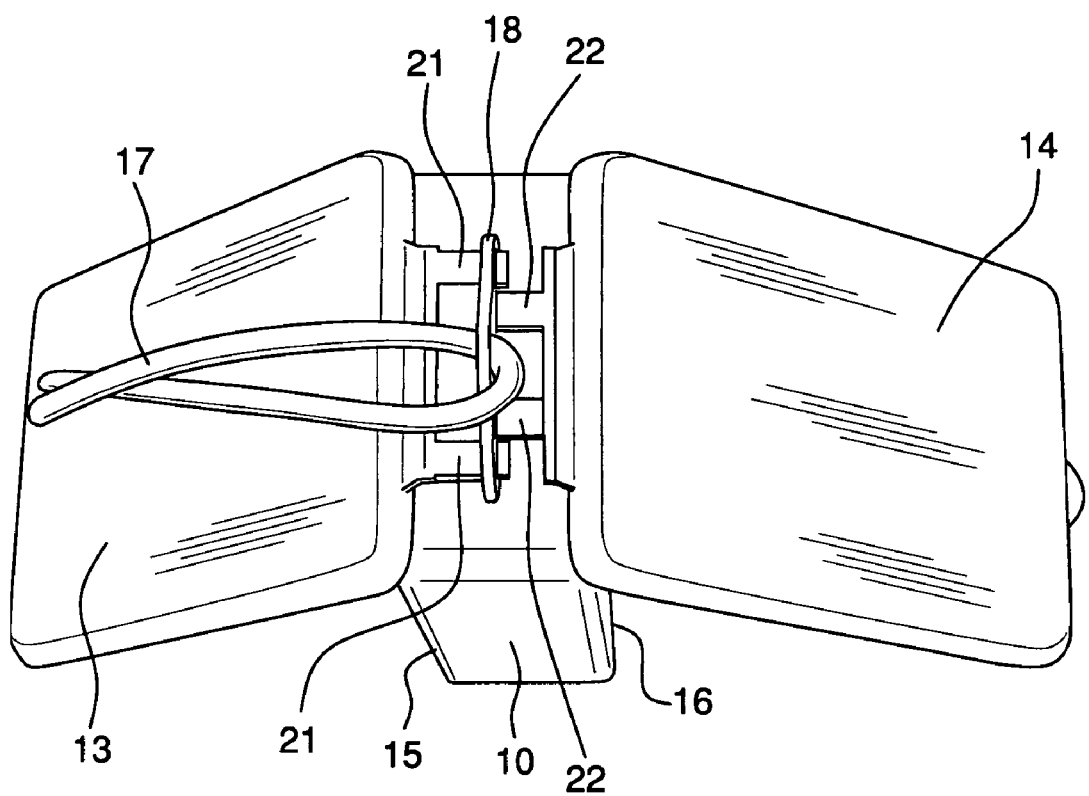
FIG. 4 is a partial top view of the scent lure of FIG. 1.

The tips of the retention tabs 21, 22 are preferably slightly enlarged with an end thickness greater than the height of the slots 20 so the enlarged ends may be forced through the slots and then retain the respective covers 13, 14 attached to the extension tab 18 of the scent lure body 10 as illustrated in FIG. 4. The tips of the retention tabs 21, 22 are preferably beveled or rounded to facilitate insertion of the retention tabs 21, 22 through the slots 20.

Figure 2:
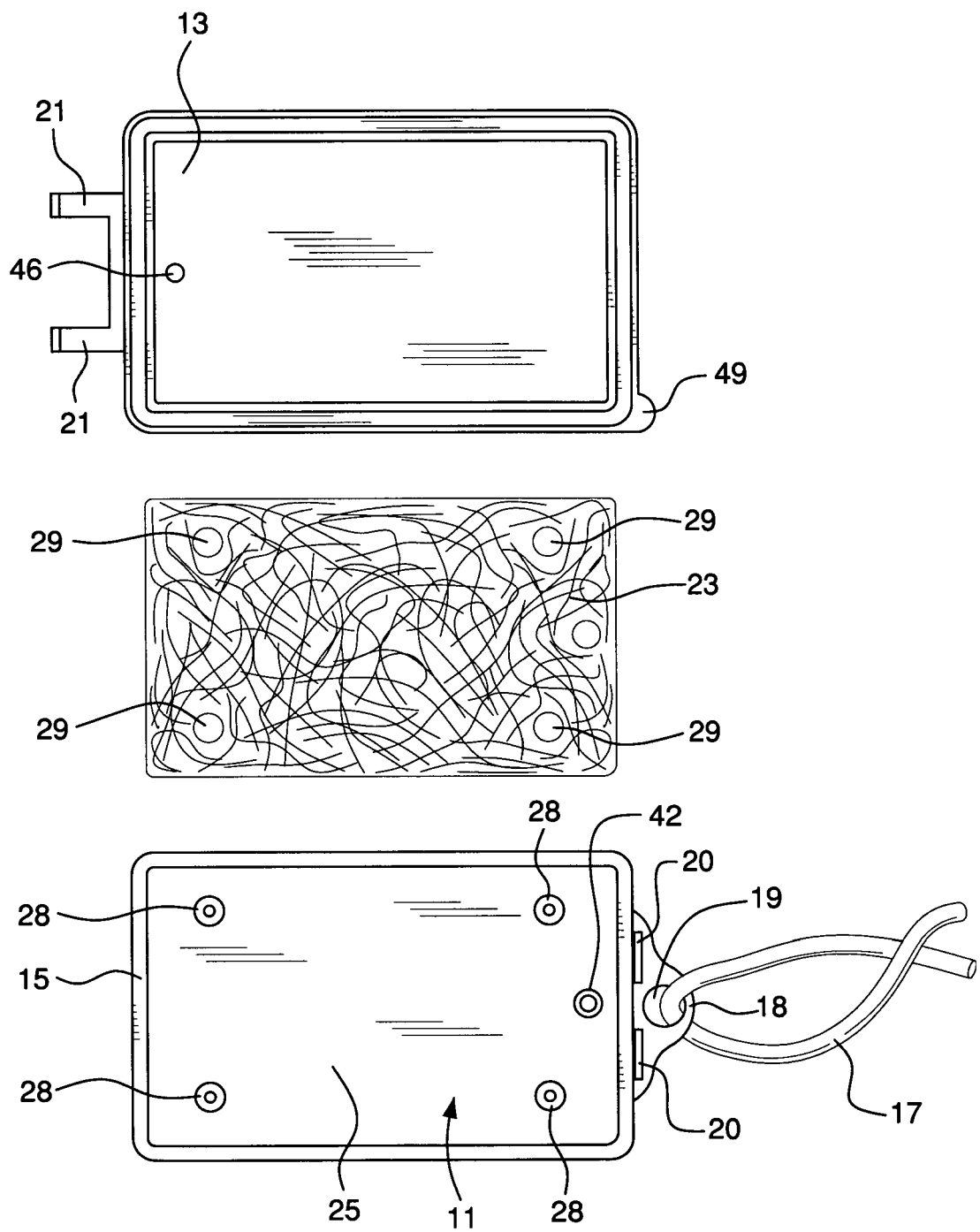
FIG. 2 is an elevated view of the scent wick compartment components of the scent lure of FIG. 1.

As best seen in FIGS. 1 and 2, the scent wick compartment 11 is configured to receive a scent wick 23 against a rear wall 25 that is shared with the heating element compartment 12. The scent wick 23 preferably has substantially complementary dimensions with respect to the scent wick compartment 11 and is preferably made of an absorbent material such as foam or cotton. The depth of the scent wick compartment 11 is preferably substantially equal to the thickness of the scent wick 23.

Preferably, four retaining bosses 28 protrude from the scent wick compartment side of the dividing wall 25 and the scent wick preferably contains complementary apertures 29. During use, the wick 23 is preferably saturated with animal scent and disposed in the scent wick compartment 11 in engagement with the protruding bosses. The cooperation of the bosses 28 and scent wick apertures facilitates the positioning of the scent wick 23 in substantial contact with the dividing wall 25. This also serves to maintain the scent wick 23 mounted within the compartment 11 during use.

Figure 3:
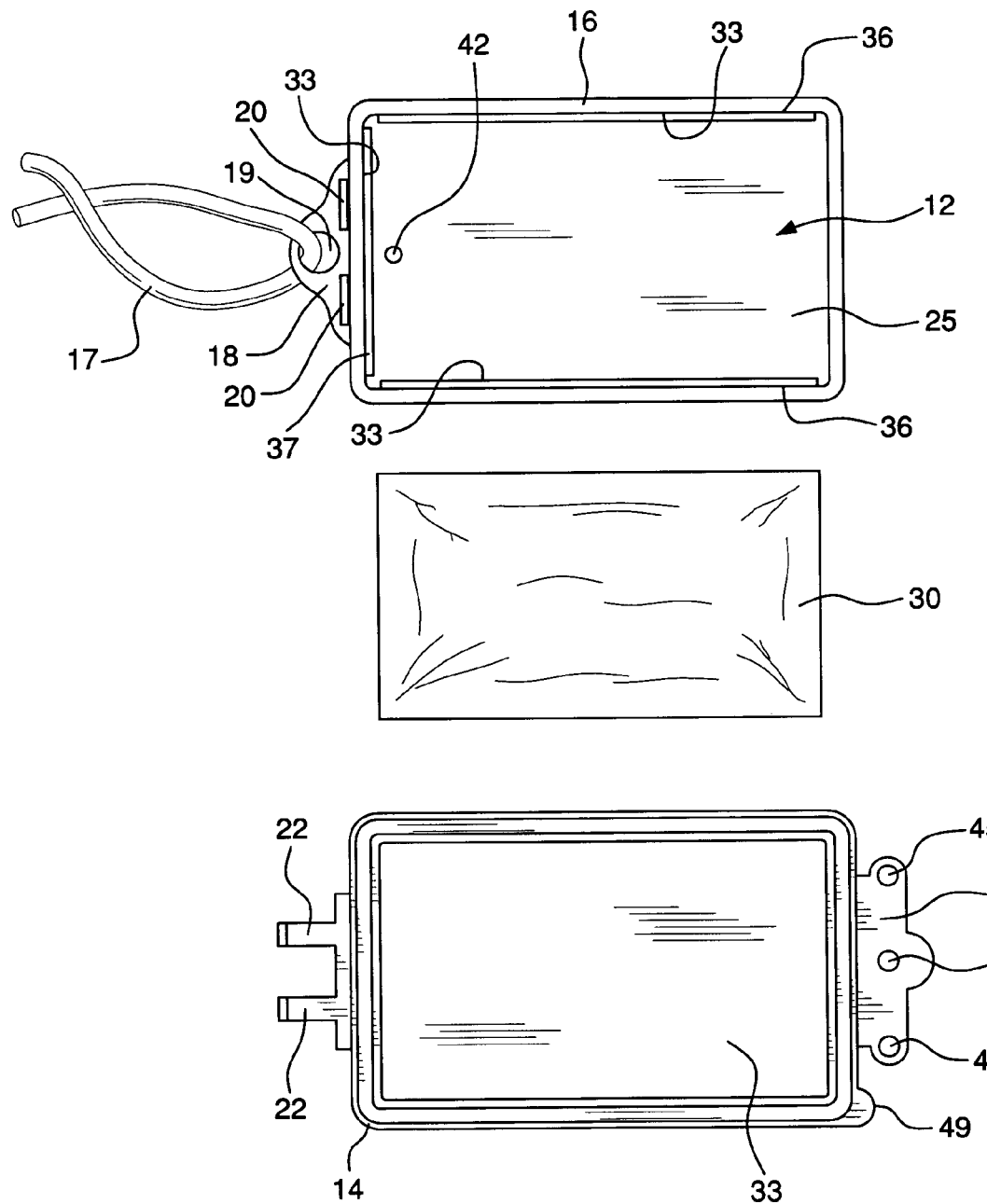
FIG. 3 is an elevated view of the heating element compartment components of the scent lure of FIG. 1.

As best seen in FIG. 3, the heating element compartment 12 is designed to enclose a conventional disposable heating element 30, such as the HotHands-2® hand warmer, by Heatmax, Inc. of Dalton, Ga. Preferably, insulation 33 is provided on the compartment cover 14 and interior compartment side and top walls 36, 37 to focus the heat from the heat element 30 on the dividing wall 25 to enhance the heat transfer through the wall 25 to warm the scent wick 23.

Preferably the heating compartment has one or more vent apertures 40 to permit ambient air into the heating element compartment when the heating element access cover 14 is disposed in a closed position to otherwise seal the heating element compartment 12 as depicted in FIG. 1. Venting facilitates continued activation of typical conventional heating elements that require air for their exothermic operation.

Irrespective of whether the heating element requires ambient air for operation, the heating element compartment vents 40 are preferably located at a lower portion of the compartment and preferably an exhaust vent 42 is provided at a location above the air vents 40 in order to create a chimney effect through the heating element compartment. In operation, when an active heating element 30 is disposed within the heating element compartment 12 with the compartment cover 14 closed, ambient air enters the vent apertures 40 and warmed air exits the exhaust vent 42.

As best seen in FIGS. 1 and 2, the exhaust vent 42 preferably extends through the dividing wall 25 and the scent wick compartment 11 so that the exhausted warm air exits over the scent wick compartment. Preferably the retention tabs 21 of the scent wick cover 13 are configured to maintain the scent wick cover above the exhaust vent 42 when the cover 13 is open so that warm exhaust air is deflected off of the scent wick compartment cover 13 over the scent wick compartment 11. This enhances the scent dispensing when a scent saturated wick 23 is disposed within the scent wick compartment 11 as illustrated in FIG. 1.

The heating element compartment cover 14 preferably includes a vent closure element extension 44 which is operable to seal the vent apertures 40 for storage. The vent closure extension 44 preferably has a one or more projecting elements 45 that are complimentary to and configured to seal the vent apertures 40. The scent wick compartment cover 13 is preferably configured with an exhaust vent closure element 46 which serves to seal the exhaust vent 42 when the scent wick compartment cover 13 is closed to seal the scent wick compartment 11. In the preferred embodiment as illustrated, with both covers 13, 14 and the vent closure element 44 in their closed positions, the scent wick compartment 11 and the heating element compartment 12 are completely sealed to facilitate transport and storage of the scent lure dispenser.

Optionally each of the covers 13, 14 may include an extending lift tab 49 to assist a user in opening the covers to access the respective compartments 11, 12.

While the above description provides details of a presently preferred embodiment, it is not intended to be limiting. The size and arrangement of the components may be varied within the keeping of the spirit of the invention. Other changes and variations will be apparent to those skilled in the art.

What is claimed is:

1. A scent lure comprising:
   a container body having a sealable wick compartment and heating element compartment with a common dividing wall separating the two compartments along an entire length of the sealable wick compartment and heating element compartment;
   the scent wick compartment having a scent wick disposed therein and a sealable cover for exposing the scent wick during use and sealing the scent wick compartment when not in use; and
   the heating element compartment having a heating element removably disposed therein and an access cover for permitting the heating element to be disposed in and removed from the heating element compartment independent of the scent wick compartment.

2. The invention according to claim 1 further comprising a hanging element for supporting the heater in a hanging orientation from a support.

3. The invention according to claim 1 wherein the sealable cover, when opened, exposes an opening in the scent wick compartment that corresponds in shape and size to the dividing wall.

4. The dispenser of claim 3 wherein the scent wick compartment includes retaining bosses protruding from the dividing wall and the scent wick has a shape and size corresponding with the compartment opening with boss engaging apertures that facilitate retention of the scent wick positioned within the scent wick compartment during use.

5. The invention of claim 4 wherein the opening, the scent wick, and the dividing wall are all rectangular in shape and have substantially the same length and width.

6. The invention according to claim 5 wherein the scent wick has a thickness substantially equal to the depth of the scent wick compartment and the heating element is rectangular in shape and corresponds with the dimensions of the heating element compartment.

7. The invention according to claim 1 wherein the heating element compartment contains at least one air vent that permits ambient air to enter the compartment when the compartment access cover is closed.

8. The invention according to claim 7 wherein the air vent is disposed in a lower portion of the heating element compartment and an exhaust vent is provided at a position above the air vent and configured such that when the scent wick compartment is open and an active heating element is disposed within the heating element compartment with the access cover closed, a chimney effect is created by ambient air entering the air vent and heated air exiting the exhaust vent proximate the scent wick compartment.

9. The invention according to claim 8 wherein the scent wick compartment cover is configured to seal the heating element exhaust vent when sealing the scent wick compartment and an air vent closing element is also provided so that both compartments are independently sealable for storage.

10. The invention according to claim 8 wherein the scent wick compartment cover includes a retainer element to retain the scent wick cover in a position to deflect exhaust from the exhaust vent over the scent wick cover when the cover is open to expose a scent wick.

11. The invention according to claim 10 further comprising a hanging element for supporting the heater in a hanging orientation from a support.

12. The invention according to claim 10 wherein the sealable cover, when opened, exposes an opening in the scent wick compartment that corresponds in shape and size to the dividing wall.

13. The invention of claim 12 wherein the scent wick compartment includes retaining bosses protruding from the dividing wall and the scent wick has a shape and size corresponding with the compartment opening with boss engaging apertures that facilitate retention of the scent wick positioned within the scent wick compartment during use.

14. The invention of claim 13 wherein the opening, the scent wick, and the dividing wall are all rectangular in shape and have substantially the same length and width.

15. The invention according to claim 14 wherein the scent wick has a thickness substantially equal to the depth of the scent wick compartment and the heating element is rectangular in shape and corresponds with the dimensions of the heating element compartment.

16. The invention according to claim 1 wherein wall portions of the heating element compartment are insulated to assist in focusing heat from an active heating element disposed within the heating element compartment through the common dividing wall to heat a scent wick disposed in the scent wick compartment.

17. The invention of claim 1, wherein the scent wick compartment and heating element compartment have a substantially equal length and width.

* * * * *